Figure 1:
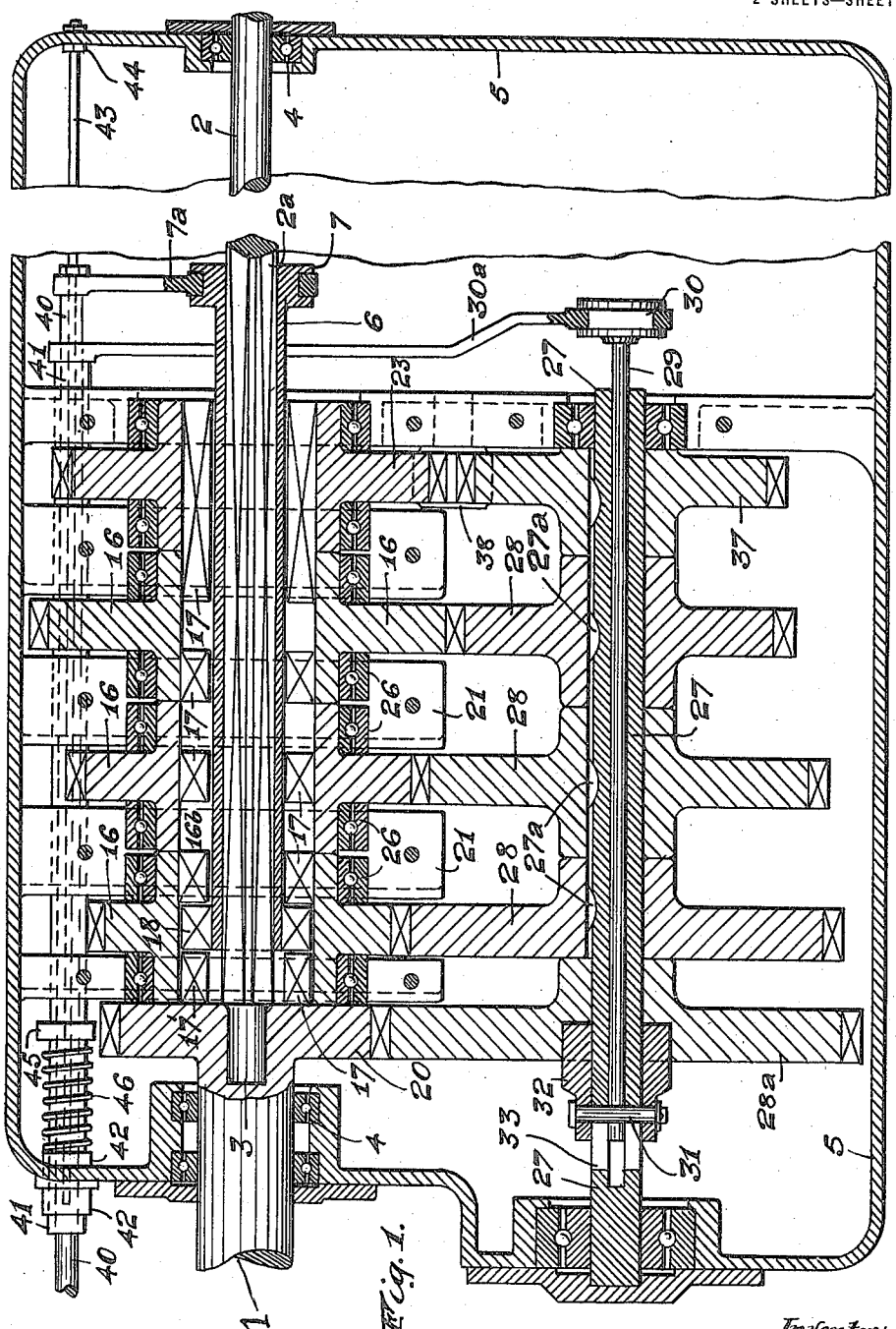

F. DEVÉS.
CHANGE SPEED GEAR MECHANISM FOR MOTOR ROAD VEHICLES.
APPLICATION FILED AUG. 10, 1914.

1,158,455.

Patented Nov. 2, 1915.

2 SHEETS—SHEET 1.

Witnesses:
W. S. Austin
Irene F. Shirley

Inventor:
François Devés.
by
Joshua R. H. Potts
Att'y.

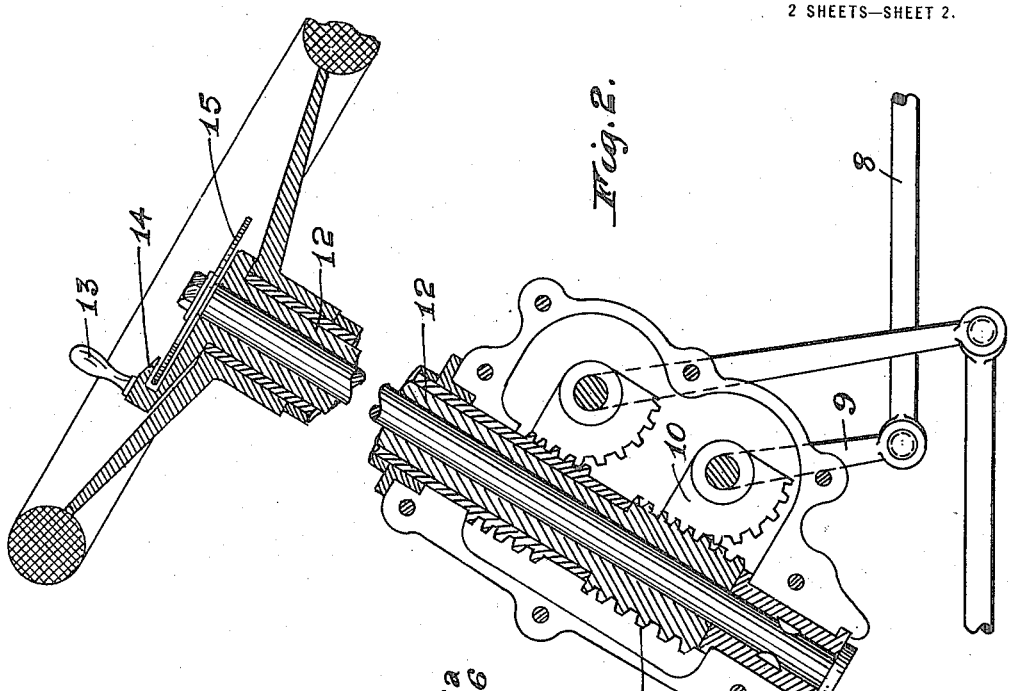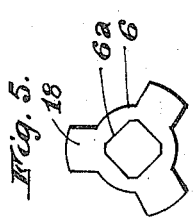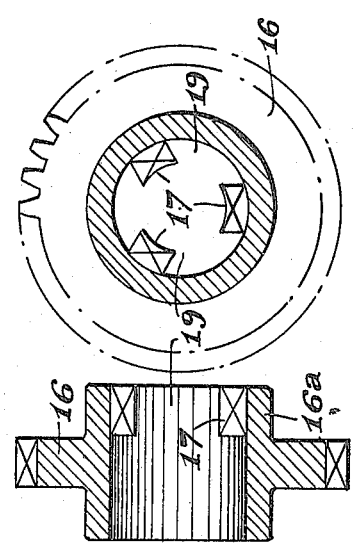

UNITED STATES PATENT OFFICE.

FRANÇOIS DEVÉS, OF LIVERPOOL, ENGLAND.

CHANGE-SPEED GEAR MECHANISM FOR MOTOR ROAD-VEHICLES.

1,158,455.   Specification of Letters Patent.   Patented Nov. 2, 1915.

Application filed August 10, 1914.   Serial No. 856,086.

*To all whom it may concern:*

Be it known that I, FRANÇOIS DEVÉS, a citizen of the United States of America, and a resident of Liverpool, England, have invented certain new and useful Improvements in Change-Speed Gear Mechanism for Motor Road-Vehicles, of which the following is a specification.

This invention relates to improvements in change speed mechanism for motor road vehicles of that type in which the gears on the lay shaft and the transmission shaft are permanently in mesh, the series of gears on one or other of the shafts being normally loose on the shaft but adapted to be coupled rotatively thereto by means of a sleeve element slidable on such shaft and having feathers or the like projections adapted to engage between projections formed in the bosses of the gear wheels, so that the drive may be taken through any gear of the series, the other gears being inoperative.

According to this invention the mechanism comprises a driving or engine shaft and a transmission shaft in alinement therewith, a lay or jack shaft being mounted in the gear box parallel to the transmission shaft, and a geared connection coupling the driving shaft to the lay shaft, a clutch mechanism being provided for rendering such geared connection inoperative. A series of gear wheels are keyed rotatively on the lay shaft, and are continually in mesh with a corresponding series of gear wheels mounted loosely on the transmission shaft, such loose gears on the transmission shaft and a pinion on the driving shaft being provided with clutch elements and the transmission shaft with a slidable sleeve having corresponding clutch elements, adapted to engage with any one of the loose gear wheels on the transmission shaft according to the speed required, or with the pinion on the driving shaft to obtain a direct drive, the same clutch elements on the sleeve being also adapted to couple rotatively to the transmission shaft the end gear of a reversing gear train.

In the accompanying drawings, Figure 1. is a view of a change speed mechanism in accordance with this invention, the gear wheels and parts of the mechanism being in section. Fig. 2. shows an arrangement for operating the gear from the steering column. Figs. 3. and 4. are a longitudinal section and end view, respectively, of one of the loose gear wheels on the transmission shaft, Fig. 5. being an end view showing the engaging feathers and squared bore of the slidable sleeve.

In carrying out the invention, the engine or driving shaft 1 is mounted in alinement with the transmission shaft 2, the latter being spigoted at 3 into the shaft 1, and both shafts being supported in bearings 4 in the gear box 5. The transmission shaft 2 is squared, keywayed, or otherwise formed at $2^a$ for a part of its length, by means of which it is rotatively coupled to a slidable sleeve 6, or the like, having a squared bore $6^a$, Fig. 5., in such manner that the sleeve may be slid axially along the shaft, but is keyed rotationally therewith. Instead of the squaring of the shaft, a keyway may be cut therein, and a feather or key provided on the sliding sleeve engaging such keyway on the shaft. The sliding sleeve 6 is adapted to be moved along the transmission shaft 2 by means of a forked arm $7^a$ engaging a channeled race 7 on the sleeve, such forked arm being operated by, say, a pedal or handle articulated in any suitable manner to the rod 40 which is slidable in a tubular element 41, the latter being in turn slidable in a bearing 42 fitted into the casing. Both elements 41 and 42 are supported upon a rod 43 which is secured at one end 44 to the casing and penetrates the rod 40 to the bearing 42. Such an arrangement gives support to the elements 40, 41, and permits relative sliding between them. An abutment or collar 45 is formed on the tube 41, and a spring 46 fitted between the collar and the bearing 42.

In Fig. 2. an arrangement is shown for effecting the slidable movement of the sleeve 6 from the steering column, a link 8 being coupled to the rod 40 for controlling the sleeve, such link being connected to a lever 9 mounted on the spindle of a gear sector 10, meshing with a worm 11, carried on a sleeve 12 concentric with the steering wheel column. The upper portion of this sleeve is fitted with a regulating handle 13, the pointer 14 of which is adapted to move over a graduated dial 15, the graduations on which indicate the various axial positions of the sleeve 6 corresponding to its clutching positions of the primary gears 16 to the shaft 2. By rotating the handle 13 to any given graduation, the corresponding speed is obtained.

Mounted concentrically but loosely with reference to the transmission shaft 2, are a series of primary gear wheels 16 through the bores of which the sleeve 6 slides. The interiors of the bores of the primary gears 16 are provided with clutch elements 17, and the exterior of the sleeve with feathers or projections 18, Figs. 1. and 5., which are adapted to engage with the clutch elements 17. These clutch elements 17 are less in axial length, Fig. 3., than are the bosses 16$^a$ of the gear wheels, so that when the primary gears 16 are assembled together, as shown in Fig. 1., on the transmission shaft 2, annular clearness 16$^b$ are left between the clutch elements 17 of adjacent primary gears, the internal diameter of these annular clearances corresponding to the over-all diameter of the feathers on the sleeve 6, and the axial length of the clearances being slightly greater than the axial length of the feathers 18. When, therefore, the sleeve 6 is drawn along the transmission shaft 2, the projections 18 may be caused to engage in the recesses 19 between the clutch elements of any primary gear 16, or to idly rotate in the annular clearances 16$^b$ between the clutch elements of adjoining gears. In this way, the transmission shaft 2 may be rotatively coupled to any one of the primary gears 16.

A pinion 20 is fixed on the end of the engine or driving shaft 1 and disposed at one side of the primary gears, such pinion 20 being provided with interior clutch elements 17' and recesses for engagement by the feathers 18 in the way just described with reference to the gears 16. When the sleeve 6 is slid over to the left until the feathers 18 engage the clutch elements in the pinion 20, a direct drive is obtained from the engine shaft 1 to the transmission shaft 2. An end gear wheel 23 is mounted loosely on the transmission shaft 2, similarly to the gears 16, and is also provided with clutch elements 17 adapted to be engaged by the sleeve feathers 18. The clutch elements 17 of the middle gear 16 are disposed centrally in the axial length of the boss, while those of the adjoining gears are disposed near the opposing ends of their bosses, and the clutch elements 17 of the pinion 20 and of the end gear 23 are entered in the bosses of the outer gears 16. In this way the total axial travel of the sleeve is reduced while maintaining long bosses on each gear 16, so that twin ball bearings 26 may be fitted to the exterior of the boss of each gear 16. The ball bearings are carried in brackets 21, and centralize the gears relatively to the shafts 1 and 2.

Mounted in the gear box, parallel to the shafts 1 and 2, is a lay shaft 27 squared or keyed at 27$^a$ to receive a series of secondary gear wheels 28. Within the bore of the lay shaft 27 is fitted a bolt 29 adapted to be operated slidably by a fork race 30 secured to the bolt 29, the other end of the bolt being connected by a pin 31 to a clutch member 32 slidable on the shaft 27 and adapted to be disengaged from an end gear wheel 28$^a$, which is loose on the lay shaft. Slots 33 are formed in the lay shaft to permit of the travel of the coupling pin 31 when the clutch member 32 is moved axially by the fork race 30 out of engagement with the end gear 28$^a$. The race 30 is engaged by a forked arm 30$^a$ connected to the tube 41, and the clutch member 32 is normally kept in engagement with the end gear 28$^a$ by the spring 46 bearing against the collar 45, and pressing the arm 30$^a$ outward. When the clutch is in engagement the gear 28$^a$ is coupled to the lay shaft 27 but is otherwise loose on said shaft. An end gear 37 is keyed on the lay shaft and coupled to the end gear 23 on the transmission shaft by an intermediate pinion 38, these gears forming a reversing train.

When it is desired to directly connect the transmission shaft to the engine shaft 1 the sleeve 6 is moved from the position shown until the feathers 18 engage the clutch elements in the primary pinion 20. This action also causes the fork race 30, the upper end of the arm 7$^a$ bearing against the end of the arm 30$^a$, to slide the bolt 29 in the lay shaft 27, and disengage the clutch member 32 from the end gear 28$^a$, thus permitting this end gear to rotate idly on the lay shaft 27. When the sleeve 6 is clutching any of the primary gears 16 to the transmission shaft 2, the drive will be by way of the engine shaft 1, end gears 20 and 28$^a$, the clutch member 32 being in engagement, and back from the lay shaft 27 through its particular gear corresponding to the clutched gear 16 on the transmission shaft 2 which is in engagement with the sleeve 6. To reverse the transmission shaft 2 relatively to the driving shaft 1, the sleeve 6 is moved completely to the right until its feathers 18 engage the clutch elements 17 of the end gear 23 of the reversing train, the drive from the shaft 1 being then by way of the gears 20, 28$^a$, the lay shaft, and gears 37, 38, and 23 to the transmission shaft.

I claim:—

1. A change speed gear comprising a driving shaft and a transmission shaft in alinement therewith, a lay shaft parallel to the transmission shaft, a geared connection between the driving shaft and the lay shaft, a series of gear wheels fixed on the lay shaft, a corresponding series of gears mounted concentrically with relation to the transmission shaft, a sleeve slidably mounted on said transmission shaft and provided with substantially radial clutch projections, inwardly projecting clutch elements on each of said last mentioned gears adapted to be engaged by said radial projections, the clutch elements on the central gear being centrally disposed thereon, those on the adjacent gears being arranged at the ends thereof adjacent the central gear and those on the end gears extending within the bosses of the adjacent gears, substantially as described.

2. A change speed gear comprising a drive shaft and a transmission shaft in alinement therewith, a lay shaft parallel with the first said shafts, a plurality of loosely mounted gears concentrically arranged with relation to said transmission shaft, a corresponding number of gears fixed to said lay shaft and meshing with the first mentioned gears, a gear fixed to said drive shaft, a gear meshing therewith and loosely mounted on the lay shaft, a rod telescoping within said lay shaft, a clutch fixed to one end of said rod, and normally coupling said loosely mounted gear to said lay shaft, an arm extending from the opposite end of said rod, a sleeve slidably mounted on said transmission shaft, clutch elements on said sleeve, coöperating clutch members on the gears on said transmission shaft and on said drive shaft adapted to be selectively engaged by the clutch elements on said sleeve, a pair of telescopic slidably mounted members, the outer member thereof being connected to the arm on said rod and the inner member thereof being connected to said sleeve, a spring normally engaging the outer telescopic member for holding the clutch on the lay shaft in engagement with its gear and the connecting means between said sleeve and its respective telescopic member being adapted to engage the arm connected to the outer telescopic member and said rod to move said rod to disengage said clutch when the clutch elements on said sleeve are moved into engagement with the clutch elements on the drive shaft, substantially as described.

In testimony whereof I affix my signature in presence of two witnesses.

FRANÇOIS DEVÉS.

Witnesses:
A. J. DANES,
T. H. WATSON.

Copies of this patent may be obtained for five cents each, by addressing the "Commissioner of Patents, Washington, D. C."